(12) United States Patent
Dussault et al.

(10) Patent No.: US 7,493,728 B2
(45) Date of Patent: Feb. 24, 2009

(54) RAINWATER COLLECTOR

(76) Inventors: Yves Dussault, 343, rue Lafontaine, Thetford Mines, Quebec (CA) G6G 3J4; Mario Lessard, 349, rue Marelle, Thetford Mines, Quebec (CA) G6G 7C6

( * ) Notice: Subject to any disclaimer, the term of this patent is extended or adjusted under 35 U.S.C. 154(b) by 267 days.

(21) Appl. No.: 11/127,930

(22) Filed: May 13, 2005

(65) Prior Publication Data
US 2005/0257433 A1 Nov. 24, 2005

(30) Foreign Application Priority Data
May 19, 2004 (CA) .................................. 2466886

(51) Int. Cl.
*E04D 13/18* (2006.01)
(52) U.S. Cl. .......................................... 52/16; 137/357
(58) Field of Classification Search .................. 52/16; 137/357; 138/114
See application file for complete search history.

(56) References Cited

U.S. PATENT DOCUMENTS

| | | | | |
|---|---|---|---|---|
| 125,742 | A * | 4/1872 | Lee ............................... | 137/873 |
| 2,636,456 | A * | 4/1953 | Cooper ........................... | 52/16 |
| 3,481,366 | A * | 12/1969 | Mortonson ................... | 137/873 |
| 4,045,964 | A * | 9/1977 | Barclay ........................ | 405/50 |
| 4,726,151 | A * | 2/1988 | Vitale ............................. | 52/16 |
| 5,114,594 | A * | 5/1992 | Rosebrock et al. ........... | 210/767 |
| 5,406,756 | A * | 4/1995 | Bemis et al. .................... | 52/16 |
| 5,406,966 | A * | 4/1995 | Lepkowski et al. ....... | 134/104.4 |
| 5,533,303 | A * | 7/1996 | Harvey ........................... | 52/16 |
| 5,681,455 | A * | 10/1997 | Takai et al. .................. | 210/154 |
| 6,619,312 | B2 * | 9/2003 | Doiron ........................ | 137/122 |
| 6,647,670 | B1 * | 11/2003 | Dran ............................. | 52/16 |
| 2005/0109693 | A1 * | 5/2005 | Allard ......................... | 210/446 |

FOREIGN PATENT DOCUMENTS

| | | | |
|---|---|---|---|
| EP | 552691 A1 | * | 7/1993 |
| GB | 2249338 | * | 6/1992 |
| JP | 05171752 A | * | 7/1993 |

* cited by examiner

*Primary Examiner*—Robert J Canfield
*Assistant Examiner*—Christine T Cajilig

(57) ABSTRACT

A gutter descent assembly (20) designed to collect rainwater falling down a house roof surface (22), the assembly comprising an upper part (26) joining at a gutter exit (23), a lower part having a faucet (30), and a descent exit (38), the three of them made in usual sheet metal. The collection of water is obtained by means of internal components forming an internal channel: a funnel (48) directs the gutter water towards an internal pipe (37), then towards the faucet (30). The water is conveyed from the faucet by a hose (34) to a tank (36). When the tank is full, or if the water runs too fast to be drained by the internal channel, apertures (50) made at the funnel (38) base allow the draining by an annular duct situated between the internal pipe (37) and the sheet metal, for directing towards the descent exit (38).

14 Claims, 7 Drawing Sheets

RAINWATER COLLECTOR

FIELD OF THE INVENTION

This invention is related to the field of rainwater collector systems; more specifically to systems adapted to house gutters.

PRIOR ART

Today, people are more aware about protection and preservation of the environment. The rational use of water is a capital step towards an integrated sustainable development strategy: drinkable water resources are few, and even if North America has plenty, a majority of human beings on Earth does not have daily access to drinking water. Even here in Quebec, several municipalities are touched by dryness every year. The first alarm signal given by town councils during dryness is generally a warning to the citizens asking to reduce the use of drinking water for lawn watering. Many people like to look at their nice green lawn for the attractive aspect given to the homes and consequently, to the neighbourhood. A need is obviously felt to permit to watering of lawns but while preserving drinking water.

The present invention proposes practical means, low in cost and easy to install and permitting to keep rainwater in anticipation of further utilization during dryness, as well as avoiding street flooding during heavy rainfalls.

Our research among patents revealed some systems proposing devices trying to find solutions to these problems.

CA 2129020, of PCT/FR93/00102 published under number WO93/15281, and also deposited in the U.S. Pat. No. 5,490,538: proposes a device anchored to an existing gutter descent wherein a hole is punched, the device comprising a deflector so called scoop channelling a part of the water running in the gutter descent towards the exterior and towards a utilization site.

U.S. Pat. No. 5,220,755, presents an external pipe at the descent of the gutter endowed with a faucet, this external pipe allowing to create a water column meant to direct water towards a utilization site as well.

U.S. Pat. No. 5,730,179, Taylor proposes a reservoir mounted directly to a house gutter network. A tank can accumulate some amount of water to discharge whenever needed; there is no excess except as limited by the tank capacity. The position of the tank is limited to the proximity of the descent post. Furthermore, the tank by its prominent position changes the structure and the look of the house on which it is attached.

U.S. Pat. No. 5,863,151, presents a rainwater collector system constituted of a collector provided with two exits 10, 18 and joined to a portion of a gutter descent. A tube 14 directs the water at the bottom of the collector towards the top of a reservoir 16, a second tube directs the water at the top of the collector towards a drain consisting of a secondary gutter descent when the reservoir is full. There is no volume of water in the gutter to fill a barrel. There is no water column to act as hydrostatic pressure. The reservoir 16 is claimed with an aperture at the top. Several elements are obvious and visible in regard of the house, for example the juxtaposed tiles 12, 18.

U.S. Pat. No. 5,533,303, proposes a rainwater channel system oriented directly towards plants. Channel reservoirs are joined to the gutter descent and direct the water towards a secondary channel which sends the water to plants hidden under a patio, while rain is falling and watering other places. A cut off valve is positioned at the bottom.

U.S. Pat. No. 5,931,118, presents a bird bath filling automatically by a channel system directing the water from a gutter descent.

Certain patents appearing less related to the invention have also caught our attention: U.S. Pat. No. 5,842,308, U.S. Pat. No. 5,735,304, U.S. Pat. No. 5,114,594, and U.S. Pat. No. 4,386,484 from classes searched: US 52/16, 137/357.

OBJECTIVES AND ADVANTAGES

The main objective of the invention is to provide homes with a system for storing rainwater in view of utilizing it at a later date for purposes other than drinking water: watering plants, for washing cars etc. The objective for a city is to reduce rainwater in heavy rainfalls which surges in large amounts into street sewage and permitting the citizens the storing of water from rainy periods to further use during dry periods when the use of drinking water is under control.

A secondary objective is to provide a system which is not costly, practical, easy to install against a gutter attached to the roof of a house and necessitating a minimum of parts and consequently a minimum of cost. To provide an aesthetic system, which does not remove any of the agreeable features of a house, that it be safe to utilize while facilitating emergency draining without flooding the gutters. It is proposed to use a canalization system inside a standard gutter descent pipe provided with a faucet or valve for discharging. The canalization system is topped by a funnel located at the very top of the descent, canalizing water inside an internal pipe to form a water column, the column providing hydrostatic pressure to convey the water towards the point of utilization or storage.

DRAWINGS

Relative to drawings which illustrate one embodiment of the invention,

Figure 2:
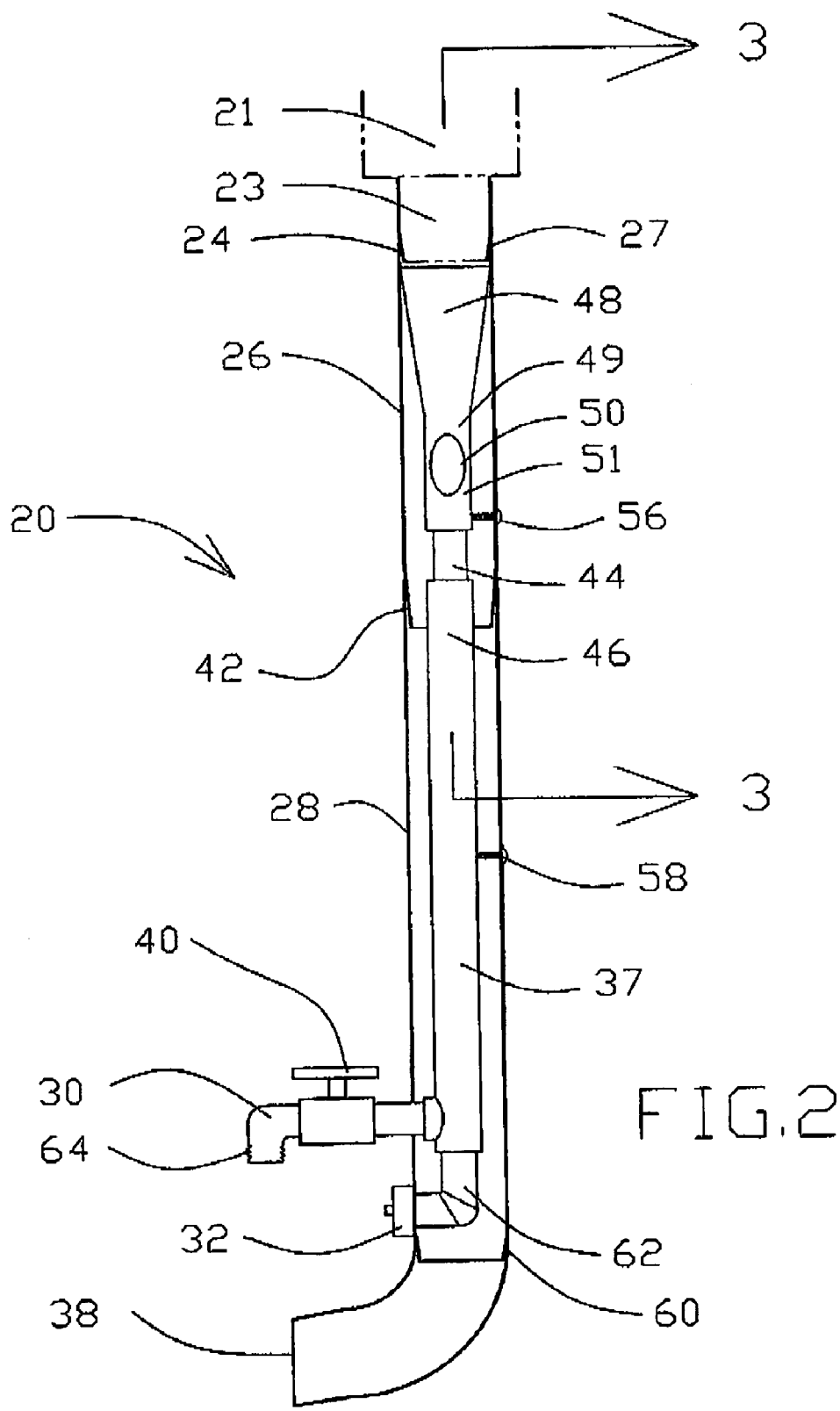
FIG. 2 is a cut according to line 2-2 of FIG. 1.

FIGS. 3A, 3B et 3C are cuts according to line 3-3 of FIG. 2.

FIGS. 4A and 4B are cuts of an alternative to the descent of FIG. 2.

Figure 5A:
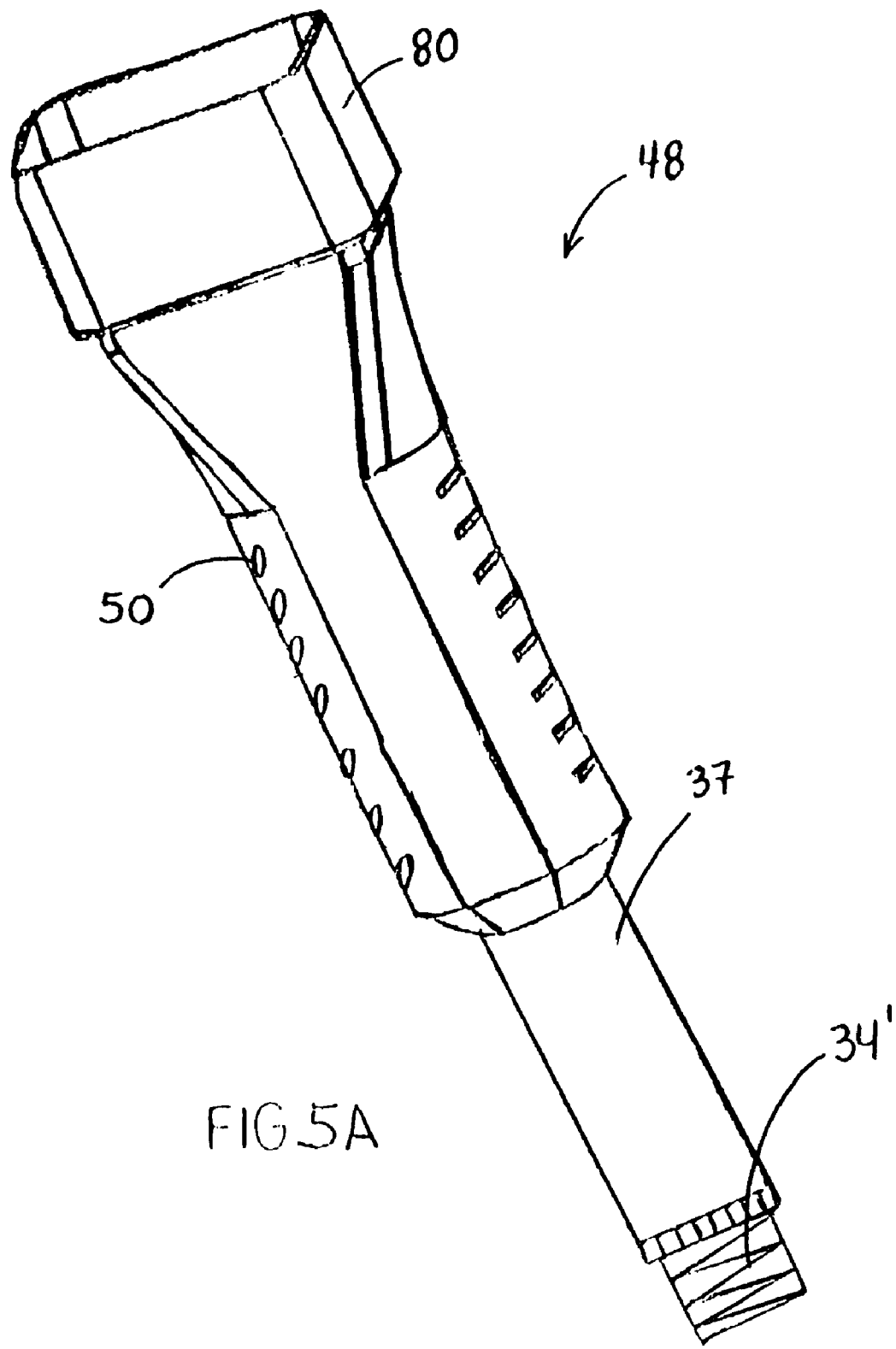
Figure 5B:
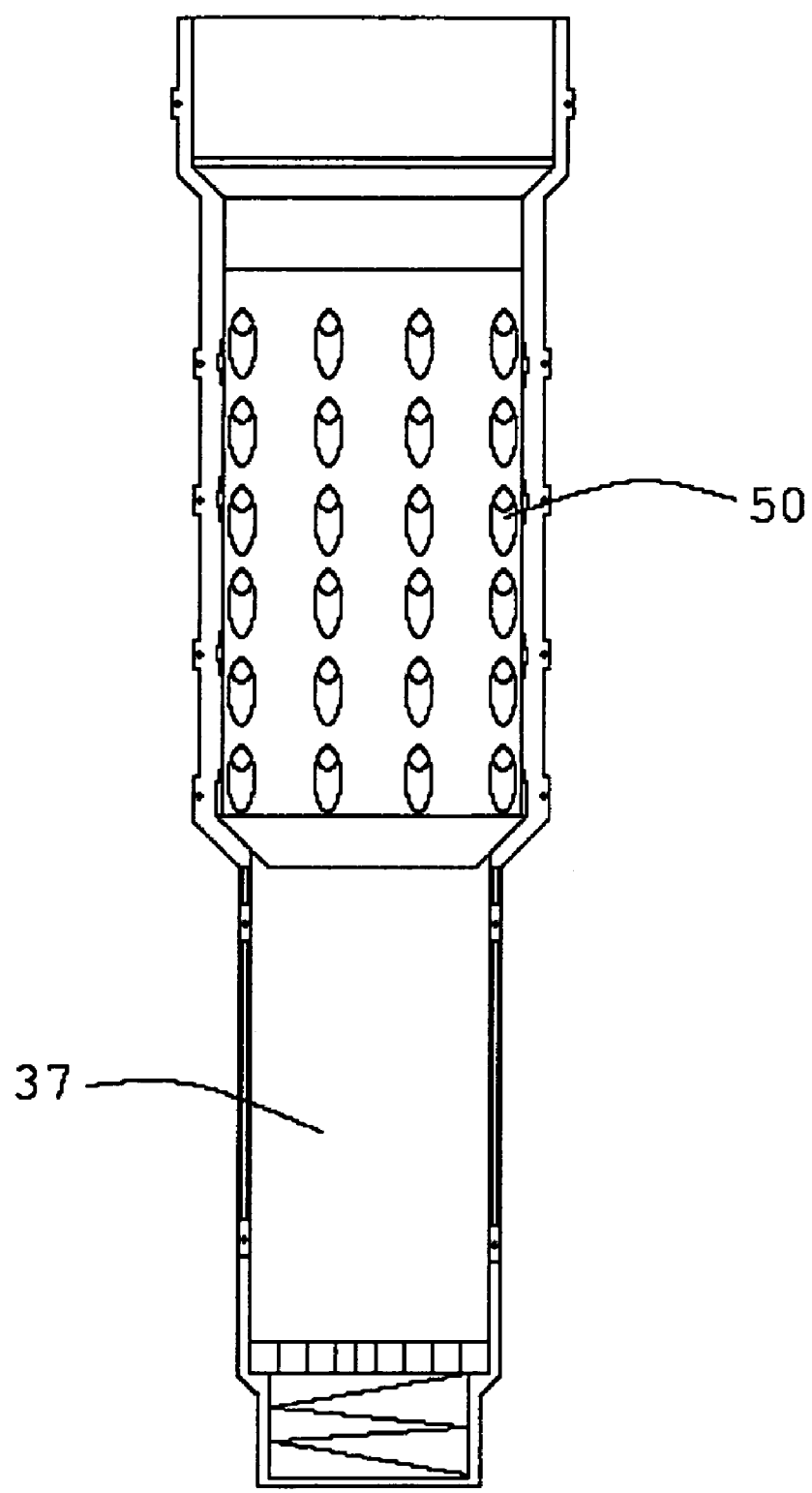

FIGS. 5A and 5B are perspectives of a part 48 and cut thereof.

Figure 6:
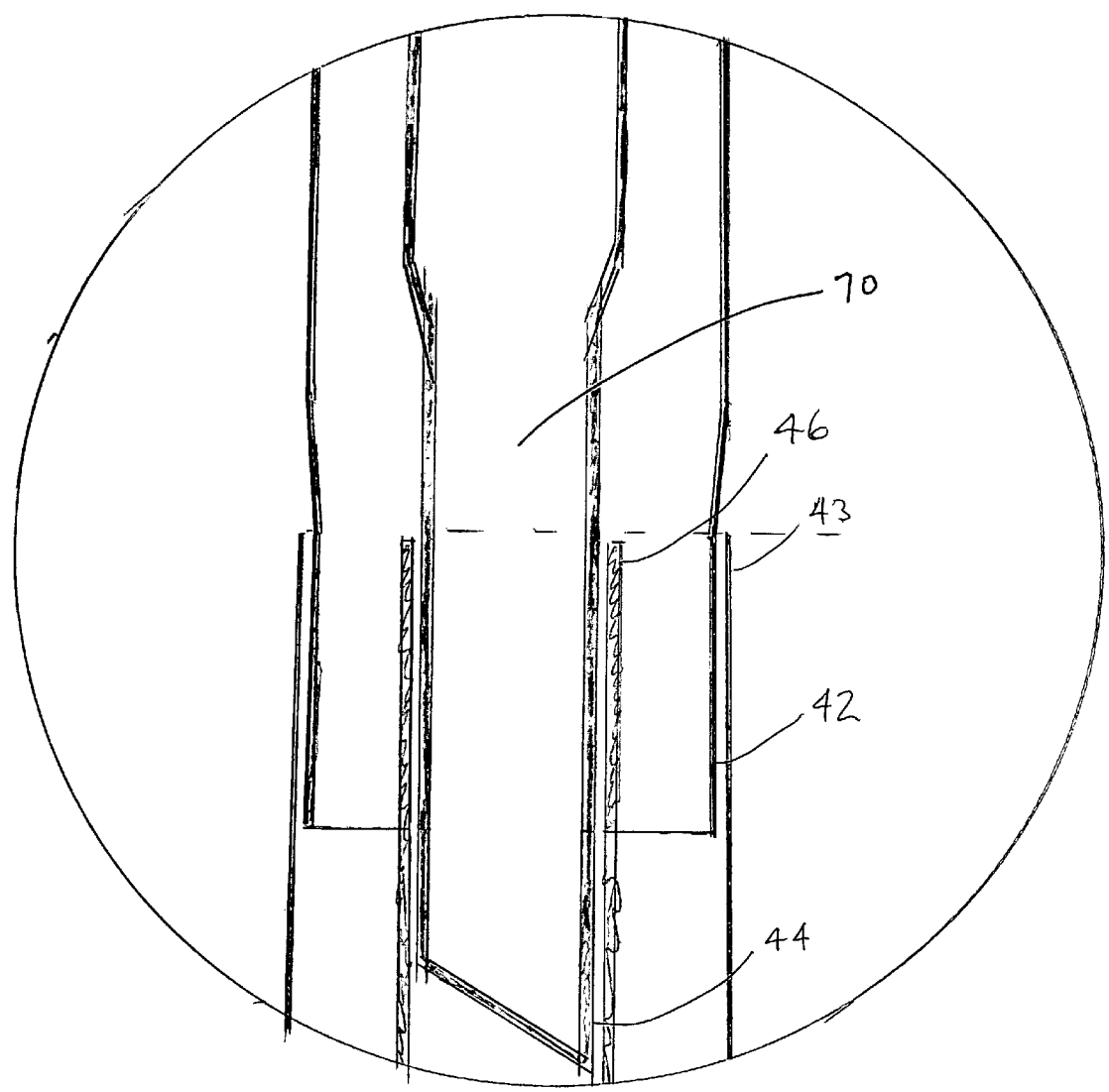

FIG. 6 is a cut view of area 70 of FIG. 4A expanded.

DETAILED DESCRIPTION OF THE DRAWINGS.

In the description which follows and in the accompanying drawings similar numbers refer to similar parts in the figures.

Figure 1:
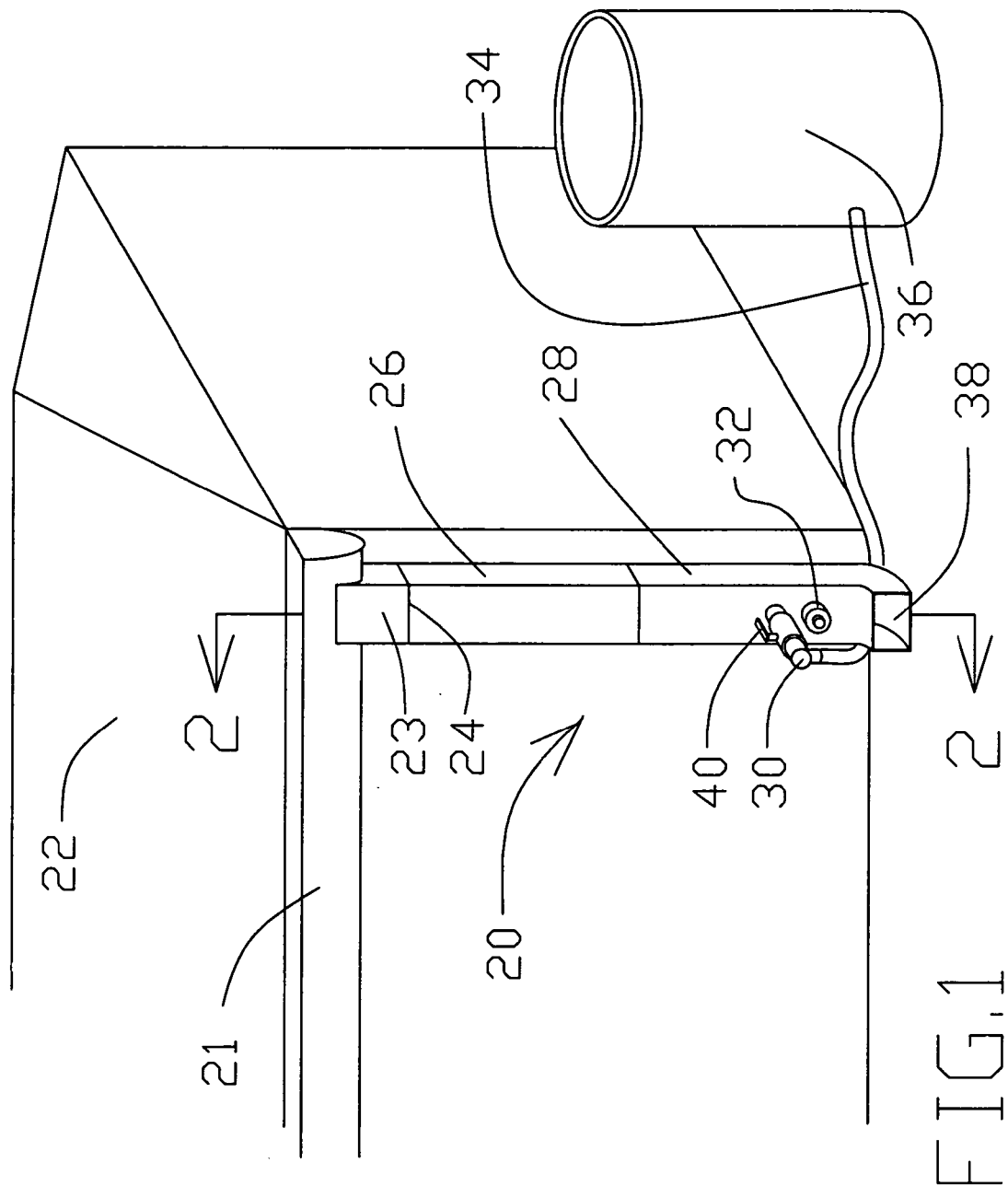
FIG. 1 is a perspective of the device installed alongside a house roof.

FIG. 1 illustrates a descent assembly 20 of a gutter collector. Joined to a horizontal gutter 21 of a house roof surface 22, at the extremity there is a gutter exit 23 finished by a male reduced end 24. The descent assembly 20 comprises three parts, an upper part 26, a lower part 28 and a descent exit 38, the three of them made in usual sheet metal. The lower part 28 has a faucet 30 assorted of a faucet valve 40 and a bleed cap 32. The water coming from the house roof surface 22 to the horizontal gutter 21 is canalized to the gutter exit 23, as seen in FIG. 2; the water exits through the faucet 30 when the valve 40 is open and is transported to a tank 36 by a hose 34. The tank 36 is an open barrel filled by its base but could be of different types depending on the application.

FIG. 2 illustrates a cut view of the descent assembly 20 that provides an inside view of the descent assembly 20. We see at the top of FIG. 2 a side view of the horizontal gutter 21, and a gutter exit 23 finished by a reduced end 24 that goes in a female top 27 of the upper part 26. A funnel 48 located at the top in the center reducing in a straight tubing 49 in which at least one aperture 50 is made. The straight tubing 49 has a diameter of typically ½ inch. A funnel top 31 has been heated from a round pipe into a typically rectangular descent assembly and its upper part 26. At a bottom part 51 of the straight tubing 49 is adapted a male end pipe 44 with a smaller diameter, for example an ABS grooved plastic pipe with a diameter of 1¼ inch to be able to penetrate inside the 1½ inch pipe. The pipe could be assembled in its ensemble. The lower part of the gutter comprises an internal pipe 37 with a diameter that could be adapted easily to the male end pipe 44 inwardly or outwardly. In the lower part 28 as in the upper part 26, the internal pipe 37 is kept in position by means of an inferior screw 58 for the lower part 28 and by a superior screw 56 for the upper part 26 or from a suitable attach system going through the external sheet metal of the descent assembly material. The joint between the upper part 26 and the lower part 28 of the descent assembly 20 is done by two points: first, the male end pipe 44 goes into the female end pipe 46 at the interior of the lower part 28, and the male end gutter 42 of the bottom of the sheet metal of the upper part 26 of the descent assembly 20 goes in the top sheet metal of the lower part 28, the latter playing a female role. The junctions of the male end pipe 44 with the lower part of the straight tubing 51 and with the female end pipe 46 are waterproof to keep the strength to the water column. The internal pipe 37 extends to evacuation components of the descent such as the faucet 30 and the bleed cap 32. These two components are attached to the internal pipe 37 going along the lower part 28 of the descent assembly 20. The lower part 28 is connected to the upper part 26 with an internal joint and an external joint. The external joint is made of the male end gutter 42 penetrating into a female end gutter 43 of the lower part 28. The internal joint is made of the male end pipe 44 penetrating into the female end pipe 46. The bottom part 51 comprises one or several apertures 50; in the illustration, one can see one in the front. One sees the funnel 48, which takes up at its top all the width of the upper part 26 of the descent assembly 20. If the water is not held back, it will go towards the bottom through the pipe and will exit either by the faucet 30 or by the bleed cap 32. However, if the water cannot be evacuated toward the bottom, it will fill the pipe to the aperture 50. All the additional water will be drained by the aperture 50 and will be conveyed outside the pipe but inside the descent gutter to the descent exit 38. Thus, the pipe forms an internal canalization that could be used as internal tank, while the room between the pipe and the sheet metal of the gutter forms an external canalization to the pipe serving as a drain. Finally, to maintain the pipes of the inner columns straight with the forms of the gutters, there is a superior screw 56 and an inferior screw 58. There is also an inner enlargement 60 between the lower part 28 and the descent exit 38. An elbow 62 stocks sand or debris until they will be drained by the bleed cap 32 that could be replaced by an upright purge device controlled by a valve driven by a handle situated where the bleed cap 32 is in FIG. 2. When the system is in use, a hose will be connected to a hose connector 64 located on the faucet 30 on the faucet valve 40.

Other configurations are possible, but this particular one provides a lot of advantages: the components are cheap, the external appearance of the house is not changed and the installation is quick and easy. In fact, during the installation, only the lower part 28 needs to be cut at its upper extremity to be adjusted at the height of the gutter of the house. With the illustrated configuration, the cutting could be done with a saw cutting simultaneously the sheet metal and the pipe, the superior part comprising the adaptation means necessary to the junction.

Figure 3:
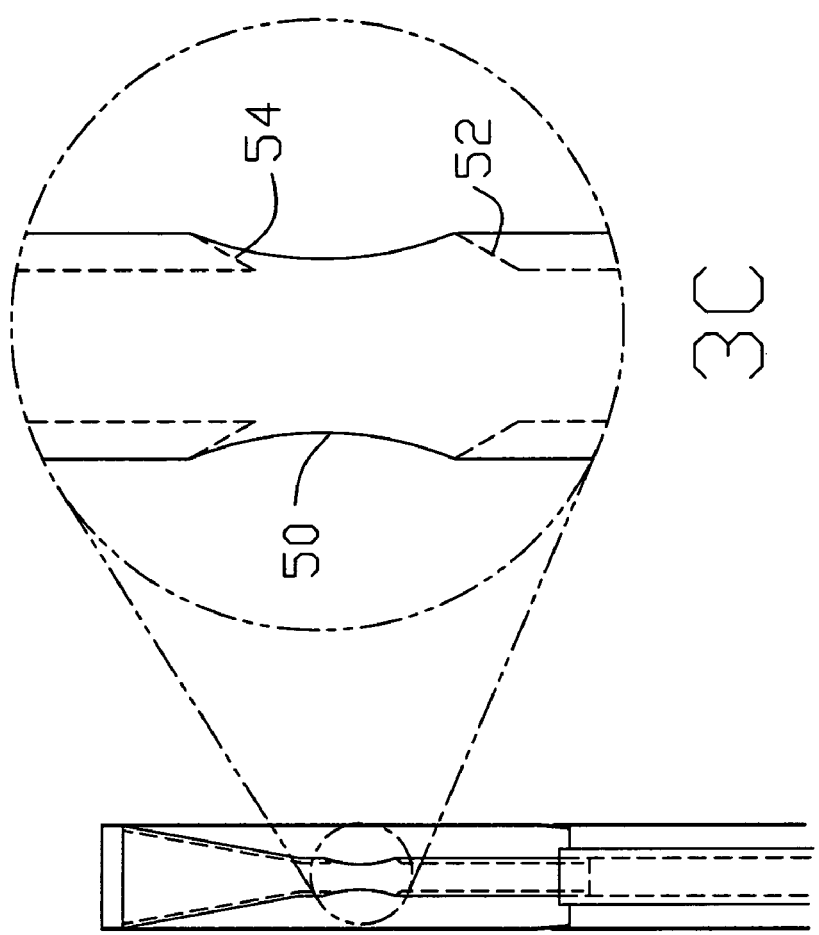

FIG. 3 is composed of three elements: 3A, 3B and 3C.

FIG. 3A, on the left side, illustrates the installation of the lower part 28 to the upper part 26 of the descent assembly 20. We notice that the male end pipe 44 will be the first to be joined to the lower part 28 by inserting it into the female end pipe 46 formed by the internal pipe 37 because this pipe exceeds the sheet metal of the upper part 26 of the descent assembly 20. Once this pipe is inserted, the male end gutter 42 of the superior sheet metal is inserted in the inferior sheet metal. With this configuration, the male end pipe 44 of the higher pipe could easily be inserted firstly in the female end pipe 46 from the lower pipe, and be pushed in until the male end gutter 42 penetrates in the female end pipe 46 of the lower part of the descent exit 28 to form the configuration illustrated in FIG. 3B. The system could be held together with a screw, but it is often solidified by a girdle around the descent, holding the descent to the wall of the house. The enlargement on the right side of FIG. 3C shown how the apertures 50 could be drilled in the pipe material at an angle, this forms a lower bevels 52 and an upper bevels 54 (shown with dash lines), that keep the water from coming out the apertures 50 when it slides on the internal sides of the pipe. Because the apertures 50 are drilled at an angle, the holes seem oval in a front view perspective as in FIG. 2.

Figure 4:
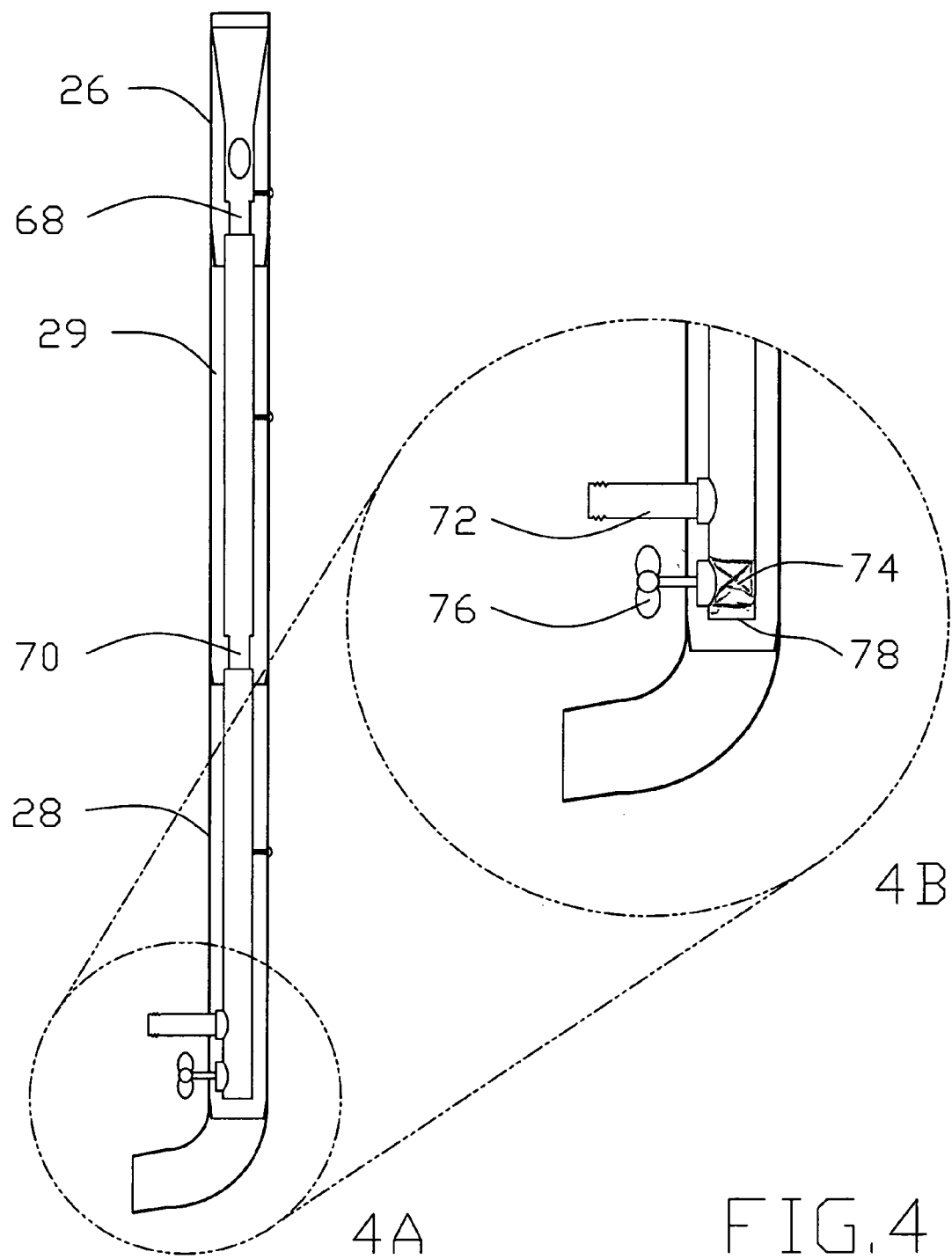

FIG. 4 shows two sections, FIG. 4A on the left, and FIG. 4B on the right; FIG. 4B is an enlargement of the circled part of FIG. 4A. FIG. 4A shows an alternative of the descent of the gutter in the event where the height available between the exit of the gutter and the ground would be greater than the length obtained by the descent when the lower section is not cut at all. An intermediary part 29 will have to be added between the upper part 26 and the lower part 28. The lower part 28 is then cut so as to be adjusted to the resulting height, whereas the intermediate section can be installed in its full length. The resulting assembly presents a first junction 68 between the higher part and the intermediary part 29, and a second junction 70 between the intermediary part 29 and the lower part 28.

FIG. 4B shows an enlargement of the lower part 28 of the descent gutter where we can see two possible modifications regarding the configuration of FIG. 2. In that case, there is no faucet, but only a direct hose connector 72 for a hose. Also, the purge does not consist of an elbow 62 and a cap but of a valve handle 74 (of which the components are not shown in the figure) installed in a straight area of the pipe towards the vertical blow off 78. The valve is activated by a valve handle 76 located outside of the gutter which permits the interior mechanism of the valve.

FIG. 5A shows a fit cap 80 as a captor head, apertures 50 of slit and oval types, the internal pipe 37 and hose 34 adaptor.

FIG. 5B shows in cut view the apertures 50 and the internal pipe 37.

FIG. 6 shows a typical intermediary jointing of gutters and pipes.

DISCUSSION ON PREFERRED APPLICATIONS OF THE INVENTION

When it rains, rainwater slides on the roof of a house, goes down towards the gutters which convey the water in the descent gutter. When the gutter descent collector as disclosed hereby is installed, the water is canalized in the funnel 48, and directed towards the lower pipe. If the faucet valve is open, water will slide down towards it. The object of the invention being collecting rainwater in a tank, the tank is advantageously connected to this faucet with a hose 34. If the tank is empty, the hose will fill up with water, and then the water will rise up towards the top of the tank (while still rising up to the same level in the descent). When the entrance of the tank is lower then the aperture 50, the tank will fill up until a maximal level associated to the height of the aperture 50. If that level is higher than the top of the tank, the water in the tank will overflow. Thus, is constituted a rainwater tank which can be used in dry periods.

UTILIZATION DOMAINS

In the case of great thunderstorms, the water flow will intensify greatly. It is then that the water column will be useful, when the water does not flow rapidly enough into the tank through the hose, the water will rise in the internal pipe 37, which will generate an increase of pressure in the hose. The water will then flow more rapidly toward the tank. It is only when the water flows excessively or when the level of water in the tank is above that of the aperture 50 that the water exits into the space between the funnel 48 and the upper part 26. One could drill an upper hole in the gutter thereby allowing massive evacuation of the water and preventing overflowing in the event that the upper apertures would not allow a proper evacuation of the water. The water inlet of the tank can be located either at the top or the bottom. In the case where the inlet is located at the top, the water in the tank will not return into the hose until the water level is not up to the inlet level. Whereas in the case where the inlet is located at the bottom, the pressure of the water will intensify in the hose. The resulting advantage of positioning the hose at the bottom is that the hose can be unscrewed from the faucet and be used for watering immediately. A valve may be positioned between the inlet and the faucet. However, when the inlet is located at the top, the hose could be unscrewed or the bleed valve opened, and the water in the tank will not go below the water inlet. The water is collected and stored in the perspective of being used, and to do so, a certain pressure is generally necessary at the end of the hose. One can use a pump to generate water pressure, for example for watering plants. However, there are ways to obtain pressure without the use of a pump. Firstly, it is possible that the tank (or in general the water reserve) be more elevated than the point of utilization. Hence, the difference in elevation will accentuate the water pressure. However, the inlet of the tank must not be above (at a superior level) the evacuation aperture of the canalization tank because if this is the case, the water will exit by this opening instead of filling up the tank.

Secondly, it would be possible to use a tank comprising only one opening. In this case, the water will take up more and more space in the tank which will fill up leaving less and less room available for air. The air will then compress, hence resulting in an increase in internal pressure. The water will go out through the evacuation exit of the reserve canalization when the pressure exerted by the water column in that canalization multiplied by the difference in elevation in relation with the water level in the tank will be equal to the internal pressure of the air in the closed tank.

SUMMARY

A device to install on a horizontal gutter 21 to collect and store rainwater, comprising:

a vertical gutter, called descent installed at one end of the horizontal gutter, comprising at least one upper section intended to collect water from the horizontal gutter 21 and a lower section intended to provide a water column, the upper section comprising a funnel 48 to collect water comprising means to collect the water from the gutter, the funnel 48 comprising at least one evacuation aperture 50, means to keep the funnel 48 and the lower section connected and generating the necessary pressure to feed a reserve tank until the rainwater overflows into the evacuation apertures and then flows along the gutter descent.

The sum of the aperture areas is preferably equal to the cross sectional area of the captor head.

The horizontal gutter 21 is installed on the side of a house roof 22, comprising a gutter exit 23 provided with a male reduced end 24 and the means to collect the water comprise a waterproof attachment for the reduced end. The waterproof attachment comprises an upper part 26 comprising a female top 27.

The upper part 26 shows an inferior screw 56 for the funnel 48, and the lower part 28 comprises an internal pipe 37, and female end pipe 4 6 to the funnel 48. The upper part 26 comprises a male gutter end 42 and the lower part 28 i s attached to the upper part 26 with the male connector, the re-attachment of the male connector to the internal pipe 37 sealing the water column inside the pipes 37, 44 and the re-attachment of the male end gutter 42 and the lower part 28 defining an annular gutter channel. The evacuation aperture is made at an angle, defining an upper bevel 54 and a lower bevel 52. There may be several straight evacuation apertures each of a small diameter, possibly in a large number.

It is well understood that the realization of the invention described above, in reference to the annexed drawings are indicative and by no means limitative, and that modifications and adaptations can be made without moving away from the bounds of the present invention.

LEGEND

20—Descent assembly
21—Horizontal Gutter
22—House roof surface
23—Gutter exit
24—Male reduced end
26—Upper part
27—Female top
28—Lower part
29—Intermediary part
30—Faucet
31—Funnel Top
32—Bleed cap
34—Hose
36—Tank
37—Internal pipe
38—Descent exit
40—Faucet valve
42—Male end gutter
43—Female end gutter
44—Male end pipe
46—Female end pipe
48—Funnel
49—Straight tubing
50—Apertures
51—Bottom part
52—Lower bevel
54—Upper bevel
56—Superior screw
58—Inferior screw
60—Inferior enlargement 62—Elbow
64—Hose plug
66—Uniform cut
68—First Junction
70—Second Junction
72—Direct pipe connector
74—Bleed off Valve
76—Valve handle
78—Vertical blow off
80—Fit cap

We claim:

1. A descent gutter (20) intended to allow the canalization of rain water toward a reservoir to be used subsequently, said descent gutter comprising an outside shell; an upper part (26) thereof being installed at a gutter exit (23) and a descent exit (38) at a lower extremity thereof, said gutter descent comprising in addition an internal canalization constituted of a funnel (48) channelling said rain water at the top of said outside shell, an internal pipe (37) with two extremities within said descent gutter, a first extremity thereof set to collect said water from said funnel, an aperture (50) made in a straight pipe (49) connected to said funnel (48), a lower part (28) of said outside shell joining said upper part (26) and a valve (40) located on said lower part (28) to control the water flow outwardly of said internal pipe; said at least one aperture (50) positioned such as when it rains the water is conveyed from a roof by said gutter exit toward said descent gutter, sliding down said funnel through said straight pipe (49) then in said internal pipe (37), an exit therefrom evacuating water when said valve is open, wherein water is filling said internal pipe (37) when said valve is closed, until overflowing said aperture (50), to flow between said internal pipe (37) and said outside shell (28), then being evacuated from said descent gutter toward the bottom descent exit (38).

2. The descent gutter of claim 1 wherein said internal pipe (37) is equipped with a faucet (30) playing the role of said valve, and wherein a hose (64) is installed on said faucet, said hose conveying the water from said faucet to a place of utilization,
wherein said place of utilization is a reservoir intended to collect rainwater, and wherein said reservoir fills up due to the water pressure generated by the filling of said hose of a lower portion of said internal pipe by the water column constituted by the filling of said straight pipe,
the gutter descent comprising in addition a bleed cap (32) located at the bottom of the lower portion (62) of said internal canalization and which allows the draining from said internal canalization of debris such as sand, leaves or branches.

3. The gutter descent of claim 1 wherein said upper part and said lower part are connected by a joint,
said joint being constituted of two parts: an interior joint joining the upper part of the internal pipe (37) to the lower part of said straight pipe (49), and an exterior joint joining the upper part (26) of the shell to the lower part (28) of the shell,
said interior joint comprising a male end pipe (44) component of a smaller diameter than said lower female end pipe (46) so as to create a male-female junction, said male end pipe component inserting in said lower female end pipe,
said external joint comprising a closed connector at the bottom of said outside shell of the upper part, so as to be inserted at the top of the outside shell of said lower part.

4. The gutter descent of claim 3 wherein said internal pipe exceeds the extremity of said closed connector, and wherein the upper extremity of said lower part of the internal pipe coinciding with the upper extremity of said lower shell, to allow the adjusting of the length of the lower part to be done with a cut line cutting simultaneously shell and pipe, and wherein the installation consists of aligning the exceeding extremity of said upper straight pipe with the lower pipe, to then insert said closed connector in the lower shell.

5. A gutter descent comprising an outer shell, an upper extremity and a lower extremity thereof, said gutter descent comprising an internal canalization within said outer shell, said internal canalization comprising a funnel (48) at its upper extremity and an exit at its lower extremity, an annular space between said internal canalization and said outer shell forming an external canalization, said internal canalization serving to convey rainwater coming from a gutter toward said exit, said external canalization serving for the evacuation of surplus water coming from said internal canalization, passing through at least one evacuation aperture (50) and discharging into said external canalization,
said internal canalization being installed inside said rainwater gutter descent, said funnel, followed by an elongated canalization located below said funnel toward the bottom, and connection means (72) for adapting to a delivery pipe positioned at a lower end thereof, thereby providing hydrostatic pressure for utilization or accumulation of rain water into a reserve, said elongated canalization of said internal canalization comprising overflow apertures (50) to discard water when a hydrostatic column fills itself to the top of the internal canalization faster than it drains.

6. The gutter descent of claim 5 wherein said exit comprises a faucet located outside said shell, but connected to said internal canalization by means of a pipe going through said shell,
wherein said outer shell is made of sheet metal, and wherein said internal canalization is of plastic pipe,
said funnel being molded to proper shape to fit said outer shell.

7. The gutter descent of claim 5 comprising in addition a continuation to said internal canalization comprising two extremities and one first extremity thereof connected to the bottom of said internal canalisation, a second extremity thereof serving as a tertiary evacuation canalization,
said tertiary canalization comprising a pipe connected at the bottom of said internal canalization, going through said shell and closed by bleed cap (32) means removable to facilitate the cleaning of said internal canalization.

8. The tertiary canalization of claim 7 comprising a pipe connected to said internal canalization comprising an extremity which is oriented toward the bottom, said pipe comprising a valve permitting the purge of said internal canalization, said valve being activated by a handle, said handle being located outside said gutter descent.

9. The gutter descent of claim 5 comprising an upper section comprising said funnel (48), and a lower section comprising said exit, said upper and lower sections being connected by two joints: an external shell joint, and an internal canalization joint, any intermediary section likewise;
said joints between said upper section and said lower section of said gutter descent comprising said external shell and said internal canalization; said external joint being constituted of a slightly closed tip at the bottom of said external shell of said upper section, to be inserted at the top of said external shell, defining a female end gutter (43) of said lower section, said internal joint being constituted of a male internal component (44) of said upper section exceeding a closed male end gutter tip (42) and of a size permitting the insertion at the top of an internal canalization female end pipe (46), said top of said internal canalization female end pine (46) coinciding with said top of said external shell, so that when installing, said closed male end gutter tip (42) is first inserted in said internal canalization of said lower section followed by the insertion of said closed male end gutter tip (42) at said female end gutter (43) of said external shell.

10. A device mounted on a horizontal gutter (21) to collect rain water and store rainwater into a reserve, said device comprising the descent gutter of claim 1.

11. The device of claim 10 in which said horizontal gutter (21) is installed on the side of a house roof (22) and comprises a descent exit (23) provided with a male reduced end (24) and said upper part (26) secured to the male reduced end of the descent exit (23) by a waterproof attachment.

12. The device of claim 11 in which said waterproof attachment comprises said upper part (26) provided with a female top (27) attached to said male reduced end and assembled until contact between said male reduced end and said funnel, said upper part (26) comprising an attachment circumferential to said funnel.

13. The device of claim 12 in which said upper part (26) comprises a male end gutter (42) and said lower part (28) is attached to said upper part (26) by said male end gutter, an attachment of a male end pipe (44) between said internal pipe (37) and said straight pipe (49) sealing said water column inside said pipes (37, 44), and the attachment of said male end gutter (42) and the lower part (28) defining an annular gutter channel.

14. The device of claim 10 in which said evacuation aperture is made at an angle, defining an upper bevel (54) and a lower bevel (52).

* * * * *